March 20, 1934.  K. L. HERRMANN  1,951,481
ANTIFRICTION BEARING
Filed April 14, 1931
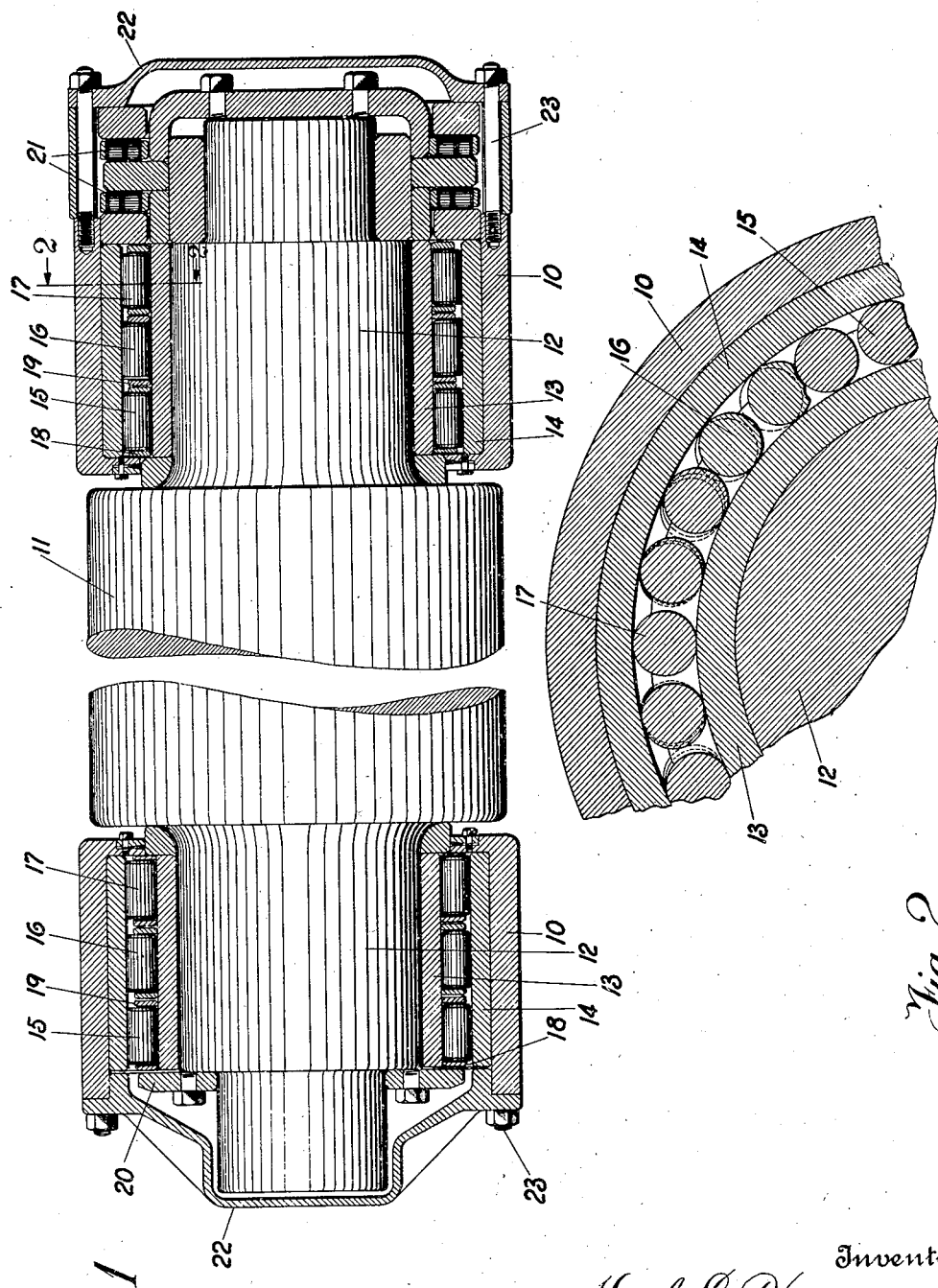
Inventor
Karl L. Herrmann
By P. W. Pomeroy
Attorney Patented Mar. 20, 1934

1,951,481

UNITED STATES PATENT OFFICE 1,951,481

ANTIFRICTION BEARING

Karl L. Herrmann, South Bend, Ind., assignor to The Bantam Ball Bearing Company, South Bend, Ind., a corporation of Indiana Application April 14, 1931, Serial No. 530,041

2 Claims. (Cl. 308—207)

This invention relates to heavy duty journal bearings and particularly to bearings adapted for use in paper making machines, machines for calendering paper and the like.

One object of the invention is to provide a bearing which comprises a rotatable axle, roller or the like, supported at its ends in journal boxes and a plurality of rows of anti-friction members positioned between the roller and journal boxes to permit easy rotation of the roller.

Another object is to provide a plurality of rollers carrying the rotatable member, each of the roller assemblies having a different number of rollers therein.

A further object is to provide three rows of rollers for supporting a rotatable shaft or the like, the rows of rollers having a progressively greater number of rollers therein.

These being among the objects of the present invention, the same consists of certain features of construction and combination of parts to be hereinafter described with reference to the accompanying drawing, and then claimed, having the above and other objects in view.

In the accompanying drawing which illustrates a suitable embodiment of the present invention and in which like numerals refer to like parts throughout the several views, Figure 1 is a longitudinal sectional view through the journal box, certain parts being in full lines to better illustrate the invention.

Figure 2 is an enlarged transverse sectional view taken on the line 2—2 of Figure 1.

Various attempts have been heretofore made to provide anti-friction bearings positioned between a rotatable member and a stationary member where heavy duty was required but these devices have not proven entirely satisfactory because the anti-friction bearings did not compensate for, or eliminate, the difficulties encountered due to inaccuracies in machining, such as "high spots" which were left on the supporting member, or the rotatable member. Having these difficulties in mind, I have provided an anti-friction bearing which will not only stand up under heavy radial loads but will in addition thereto materially relieve the friction between the rotating and stationary members.

My invention is particularly adapted for use in journal bearings used in machines for calendering paper, paper making machines, steel rolling machines and the like, although it will be apparent to those skilled in the art that my invention may be used in numerous other places where bearings are subjected to heavy radial loads.

Referring to the drawing, I have shown a journal box 10 in which is rotatably mounted the axle or roller 11, having journal ends 12 encased by a hardened and ground sleeve 13. Positioned within the journal box 10 is a sleeve 14 between which and the sleeve 13 are mounted a plurality of rows of rollers 15, 16 and 17, each row of rollers being mounted in a cage comprising the members 18 and 19. In the device shown, I have illustrated a sleeve 20 at one end of one of the roller journals 12 to prevent movement of the shaft or roller 11 in one direction and at the opposite end of the roller, I have illustrated a plurality of anti-friction members 21 mounted in a suitable cage to provide for the end thrust in the opposite direction. I also have illustrated end plates 22 secured to the journal 10 by means of the bolts 23 to seal the ends of the roller 11 and prevent dust from entering into the bearings.

In the drawing I have shown three rows of anti-friction bearings 15, 16 and 17 and it is preferable that the rollers be so spaced that there are a different number of rollers in each row. For example, if in a given size of bearing, it is found that twenty-nine rollers may be used in the row indicated by the numeral 15, I would then provide twenty-eight rollers in the row indicated by the numeral 16 and twenty-seven rollers in the row indicated by the numeral 17. It will be understood, of course, that my invention is not limited to the specific number of rollers indicated as the number of rollers will depend upon the size of the bearing and my invention is further not limited to the arrangement of the rows of rollers as above described. It is, however, a part of my invention to provide a plurality of rows of rollers, each row of rollers having a different number of rollers than the other rows.

It will be understood that formal changes may be made in the specific embodiments of the invention illustrated and described without departing from the spirit and substance thereof, the scope of which is commensurate with the appended claims.

What I claim is:

1. In a journal bearing, a journal box, a rotatable axle extending therein, spaced inner and outer sleeves between said journal box and axle, a plurality of independently rotatable cages positioned end to end between said sleeves, a row of rollers carried by each of said cages, the rows of rollers having common longitudinal axes and each having a different number of rollers, means carried by said axle to constrain the inner sleeve and rollers against longitudinal movement, and means carried by said journal box to constrain the outer sleeve against longitudinal displacement.

2. In a journal bearing, a journal box, a rotatable axle extending therein, spaced inner and outer sleeves between said journal box and axle, three independently rotatable cages positioned end to end between said sleeves, a different number of rollers carried by each of said sleeves arranged so that the rollers of one cage are progressively staggered relative to the rollers of the other cages, means carried by said axle to constrain the inner sleeve and rollers against longitudinal movement, and means carried by said journal box to constrain the outer sleeve against longitudinal displacement.

KARL L. HERRMANN.